(12) United States Patent
Fleck

(10) Patent No.: US 9,796,210 B2
(45) Date of Patent: *Oct. 24, 2017

(54) TEXTILE COVER FOR STREAMLINING WIDE BASED TRUCK OR BUS WHEELS

(71) Applicant: Moochout LLC, St. Paul, MN (US)

(72) Inventor: Jonathan E. Fleck, St. Paul, MN (US)

(73) Assignee: Moochout LLC, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/605,785

(22) Filed: Jan. 26, 2015

(65) Prior Publication Data

US 2015/0158331 A1    Jun. 11, 2015

Related U.S. Application Data

(63) Continuation of application No. 13/399,632, filed on Feb. 17, 2012, now Pat. No. 8,939,517, which is a continuation-in-part of application No. 12/365,890, filed on Feb. 4, 2009, now Pat. No. 8,382,210, which is a continuation-in-part of application No. PCT/US2007/078155, filed on Sep. 11, 2007.

(60) Provisional application No. 61/026,017, filed on Feb. 4, 2008, provisional application No. 60/843,726, filed on Sep. 11, 2006.

(51) Int. Cl.
| | |
|---|---|
| B60B 7/10 | (2006.01) |
| B60B 7/04 | (2006.01) |
| B60B 7/06 | (2006.01) |
| B60B 7/02 | (2006.01) |

(52) U.S. Cl.
CPC ............... *B60B 7/10* (2013.01); *B60B 7/04* (2013.01); *B60B 7/063* (2013.01); *B60B 7/065* (2013.01); *B60B 7/02* (2013.01); *B60B 2900/1216* (2013.01); *B60B 2900/211* (2013.01); *B60B 2900/3315* (2013.01); *B60Y 2200/14* (2013.01); *B60Y 2200/20* (2013.01)

(58) Field of Classification Search
CPC  B60B 7/10; B60B 7/063; B60B 7/065; B60B 7/04
See application file for complete search history.

(56) References Cited

U.S. PATENT DOCUMENTS

| | | | | |
|---|---|---|---|---|
| 1,390,425 | A * | 9/1921 | Blair | B60B 7/06 301/37.104 |
| 2,711,930 | A * | 6/1955 | Lyon | B60B 7/105 301/37.34 |
| 2,827,332 | A * | 3/1958 | Chamberlin | B60B 7/10 301/37.34 |
| 2,964,355 | A * | 12/1960 | Buerger | B60B 7/10 301/37.32 |

(Continued)

*Primary Examiner* — Kip T Kotter
(74) *Attorney, Agent, or Firm* — Polsinelli PC

(57) ABSTRACT

Implementations described and claimed herein provide systems and methods for streamlining wheels. In one implementation, a wheel streamlining device includes a cover assembly having a flexible connection extending around a periphery of a ring configured to contact a tapered portion of a wheel. A hook is configured to removably engage the cover assembly, and a bale is configured to releasably engage an inner surface of an opening in a face of the wheel. A springy portion extends between the bale and the hook and is configured to apply a tension force between the ring and the tapered portion of the wheel.

20 Claims, 17 Drawing Sheets

(56) References Cited

U.S. PATENT DOCUMENTS

| | | | | |
|---|---|---|---|---|
| 3,521,933 A | * | 7/1970 | Buerger | B60B 7/10 |
| | | | | 301/37.32 |
| 4,620,749 A | * | 11/1986 | McEachern | B62J 6/20 |
| | | | | 301/37.108 |
| 4,836,615 A | * | 6/1989 | Berg | B60B 7/0006 |
| | | | | 301/37.109 |
| 6,116,415 A | * | 9/2000 | Rastelli | B60C 25/00 |
| | | | | 206/304.1 |
| 8,276,992 B2 | * | 10/2012 | Smith | B60B 7/04 |
| | | | | 301/37.102 |
| 8,939,517 B2 | * | 1/2015 | Fleck | B60B 7/10 |
| | | | | 301/37.102 |

\* cited by examiner

TEXTILE COVER FOR STREAMLINING WIDE BASED TRUCK OR BUS WHEELS

CROSS REFERENCE TO RELATED APPLICATIONS

The present application is a continuation of U.S. application Ser. No. 13/399,632 filed 17 Feb. 2012 (the "632 application"), now U.S. Pat. No. 8,939,517, which is a continuation-in-part of U.S. application Ser. No. 12/365,890 filed 4 Feb. 2009 (the "890 application"), now U.S. Pat. No. 8,382,210. The '890 application is a continuation-in-part of Patent Cooperation Treaty Application No. PCT/US2007/078155 filed on 11 Sep. 2007, which claims benefit to Provisional Application No. 60/843,726 filed 11 Sep. 2006. The '890 application claims benefit to Provisional Application No. 61/026,017 filed 4 Feb. 2008. Each of these applications is hereby incorporated by reference in their entireties herein.

TECHNICAL FIELD

The presently disclosed technology involves the streamlining of motor vehicle wheels, in particular large wheels having what is called a "wide based" construction sometimes used on large, heavy-duty trucks such as long haul tractor-trailer trucks for interstate and long distance hauling as well as used on city, school, and interstate passenger buses.

SUMMARY

Implementations described and claimed herein provide systems and methods for streamlining wheels. In one implementation, a wheel streamlining device includes a cover assembly having a flexible connection extending around a periphery of a ring configured to contact a tapered portion of a wheel. A hook is configured to removably engage the cover assembly, and a bale is configured to releasably engage an inner surface of an opening in a face of the wheel. A springy portion extends between the bale and the hook and is configured to apply a tension force between the ring and the tapered portion of the wheel.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Referring to the figures, the typical motor vehicle wheel 11 to use and benefit from the disclosed method and device for streamlining etc; is sized to receive a conventional tubeless tire in a variety of sizes such as those having a bead diameter of 17.5 inches, 19.5 inches, 22.5 inches, or 24.5 inches. These motor vehicle wheels have an inwardly facing, slightly tapering cylindrical cavity with a diameter that is correspondingly smaller than the corresponding bead size. For example, the 24.5 inch wheel has a tire-mounting rim with an interior diameter of about 22.5 inches. The interior surface of the wheel terminates on its inner circular end with the bolt ring or "wheel face" for attaching the wheel to the motor vehicle running gear, and at its outer end at the outer bead mounting rim. This hollow cylinder has typically an inwardly protruding boss or "drop center" 30 positioned between the tire bead engaging portions of the rim, typically about halfway between the outwardly facing rim of the wheel and the wheel face. Thus, this drop center has an inner diameter less than the inner diameter of the wheel at the outer rim and at the wheel face. An exposed drop center construction is almost universally provided on current-day tubeless truck wheels. The primary purpose of this reduced diameter region of the wheel rim is to provide a location on the outwardly facing circumference of the wheel that has a smaller diameter than at the rim portions of the wheel where the tire beads will ultimately seat for the sealing bead of the tire to drop into when the wheel is being mounted onto or removed from the wheel rim.

Figure 10:
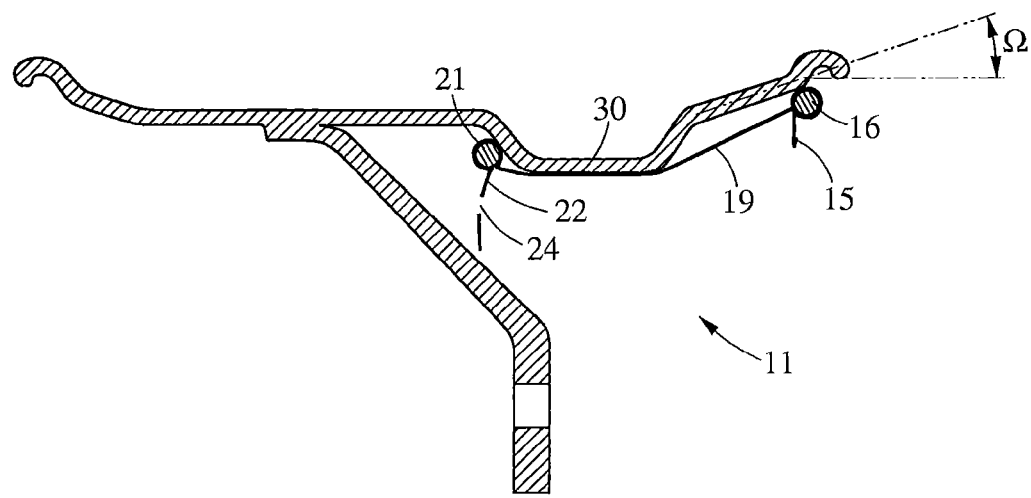
FIG. 10 is a cross section taken along line 10-10 of FIG. 9, showing a typical drop center wheel and the installed attachment system.

The depth of the hollow cavity formed in the wheel is slightly less than the width of the rim portion of the wheel. For large tractor-trailer trucks such wheels have a "bead to bead" width of about 8.25 inches although narrower wheels, such as those for motor homes may have only a width of about 6.75 inches. Such wheels may have differing locations for the drop center or boss portion. Also the inner surface diameter of these wheels may taper slightly at about a fifteen-degree rate from the outer rim to the drop center at the inner portion of the wheels (Shown as angle Ω in FIG. 10 for example).

The disclosed innovation uses this drop center or other boss that projects inwardly from the circumferential wall of a truck wheel to help position and hold the attachment system 12 for the device in place. The attachment system 12 consists of an inner ring 21 and an outer ring 16. Each of these rings consists of a flexible but generally rigid and resilient hoop of resilient stainless steel wire. The spring steel wire from which these rings may be made has approximate cross-sectional diameter of between approximately 0.100" and 0.250," for example, about 0.123". The diameter of each hoop or ring should correspond to the diameter of the inner surface of the truck wheel where the ring will be positioned when holding the device 10 in place on the truck wheel 11. Thus if the inner diameter of the wheel is 20 inches then the outer diameter of the ring or hoop of steel wire should also be about 20 inches. In one implementation, the steel ring 21 includes at least one V shaped notch or kinks 25. As illustrated in the figures, this kinked portion 25 jogs around the air filler valve stem that is usually positioned between the face of the wheel and the drop center and such relatively smaller diameter portion of the wheel cavity. This kink is where the ends of the spring steel wire are attached together, for example, by inserting these ends into an appropriately sized, V-shaped tube and attached to the wire ends by crimps 26, or otherwise fastened together in a way that will not permit them to come apart under normal operating conditions.

These two rings are interconnected with on or more strips of a flexible laminar material, which strip or strips are permanently sewn to the rings 16 and 21 and extend over the drop center or boss portion of the wheel when the attachment system is properly installed. In the figures, this material is a polyvinyl chloride coated textile typically used for inflatable watercraft, truck tarps, or the like. This material is very durable and yet can be cut and sewn like many industrial textiles. This material lends itself to being folded over and sewn to each of the rings as shown in the figures. The dimensions for this annular strip of coated textile are critical. It should be wide enough to form the flexible connection 19 as shown to accommodate the drop center, yet position the outer ring 16 snugly within the corresponding outermost tapered portion of the truck wheel near the outer tire engaging rim of the wheel. This width dimension of 19 is critical to the self locating or self centering function of the disclosed cover device. The width of the flexible connection 19 is determined in part by the finished width of the flexible material sewn between the rings 16 and 21. This dimension should be consistent around the entire circumference of the attachment system. It should be just long enough to place the outer ring 16 at the outermost edge of the tapered portion of the wheel cavity when the connection 19 is pulled between the inner or second ring 21 and is pulled tightly against the drop center. Thus, the second ring serves as an anchor held against the inward facing surface of the drop center or other reduced diameter portion of the wheel to be covered, while the flexible connection 19 precisely controls the spacing between the second ring and the ring 16 and thus the cover 13. So, when properly dimensioned, the attachment system 19 permits the cover portion to center itself on the tapered portion of the wheel, even after it may become dislodged slightly from its ideal centered position on the wheel.

The surface contact between the wheel's inner surface and the lamina 19 connecting the two rings over the drop center is likely of particular importance. The greater the areas of contact, the more secure the mounting. The frictional engagement between the attachment system 12 and the wheel 11 may be enhanced by using a material coating with a high coefficient of friction such as rubber, synthetic rubber, and the like. To further compliment the integrity of the mounting system, oval-shaped cutouts 20 permit the strip or strips of the flexible lamina 14 to conform to the smaller diameter of the drop center portion of the wheel 11, yet be firmly sewn to all or almost all of the circumferences of the steel rings 16 and 21.

Figure 13:
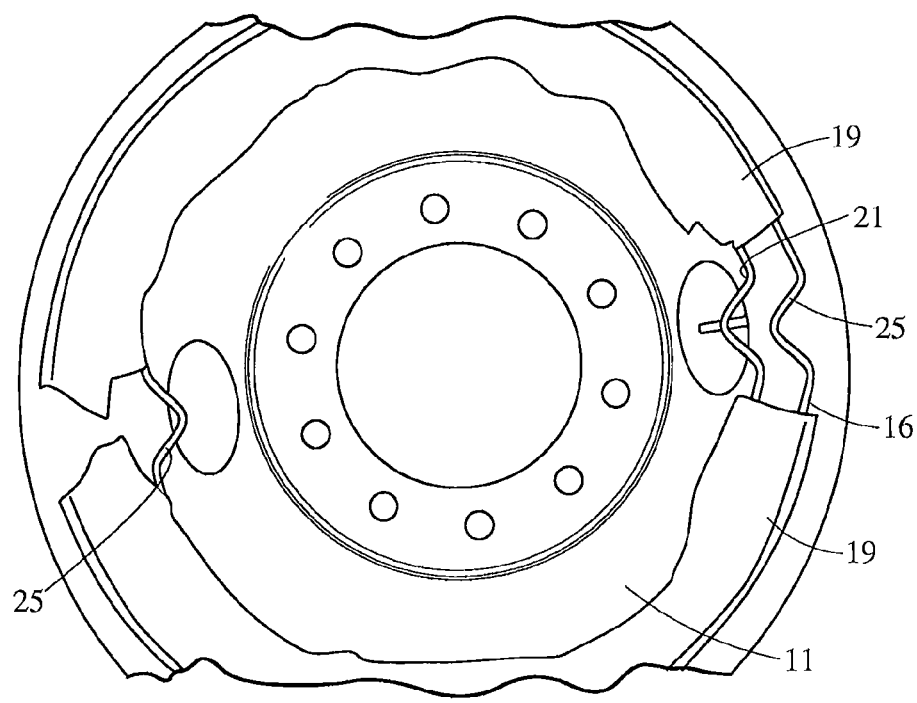
FIG. 13 shows an alternative construction of the attachment portion.
Figure 14:
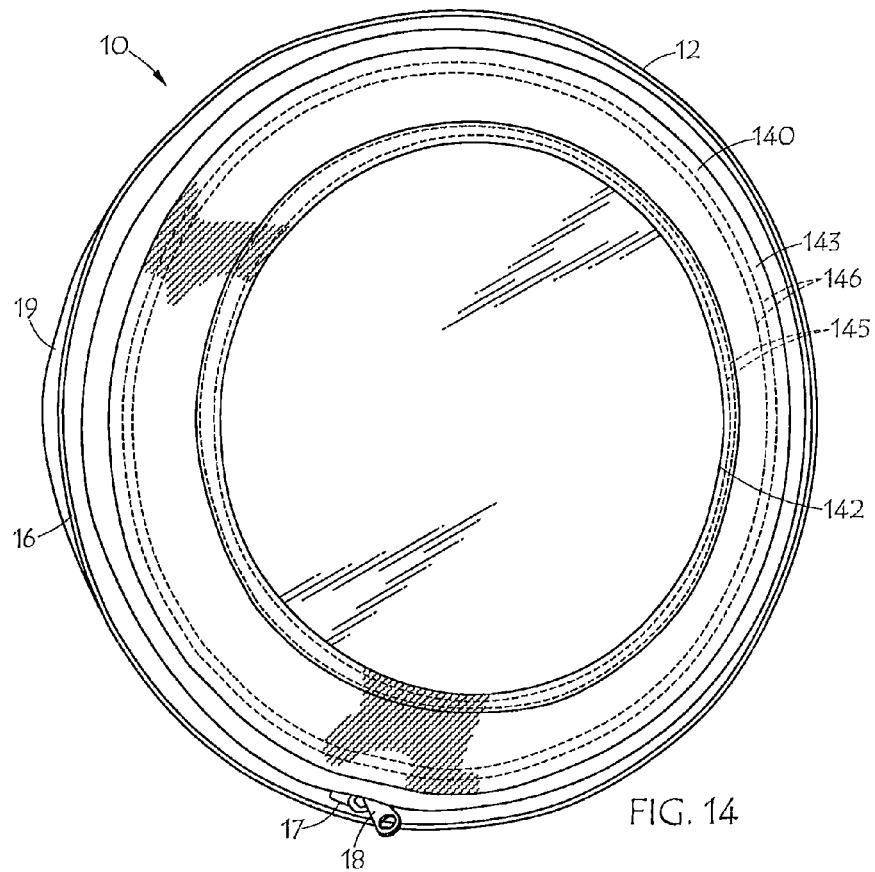
FIG. 14 shows an overall view of the improved wheel cover assembly comprising a cover portion and an attachment assembly (seen projecting beyond the left edge of the cover portion) with a display card with graphic indicia installed inside the transparent window.

In an alternate implementation, this continuous annular strip of textile material can be replaced or supplemented by several (between 8 and 12) hook and loop fastener strap pairs which extend between the inner and outer rings. In one implementation, the inner spring steel ring has a series of "D" rings positioned to receive conventional hook and loop cinch straps sewn to the outer ring. This hook and loop fastener scheme permits more precise dimensioning of the distance between the inner and outer ring and thus is more versatile because it accommodates wheels having various axial dimensions, or having their drop center portions of differing circumferences and at different distances from the outermost ring engaging edge of the wheel rim. Another implementation is shown in FIG. 13, where the flexible lamina is provided in two strips, each extending between the first notch 25 (constructed of the crimped tube 26 as detailed above, and a second notch 25 formed in the wire ring.

Whether or not the inner and outer rings are connected with flexible lamina and/or adjustable straps, the outer ring 16 includes a sewn attachment to one track of an industrial strength zipper 15. This zipper extends around the entire circumferences of wheel and as sized to accommodate the corresponding zipper track, which in turn is attached to an outer periphery of the disk wheel cover 13.

Figure 1:
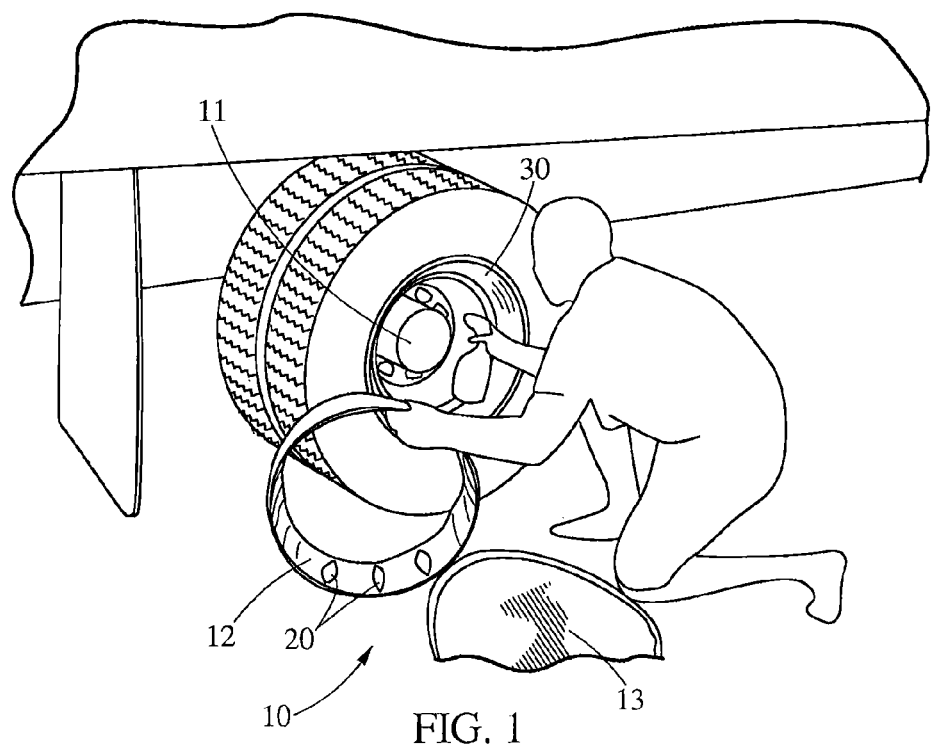
FIG. 1 shows a typical large motor vehicle wheel being prepared to receive the attachment device in the wheel covering method of this disclosure.
Figure 6:
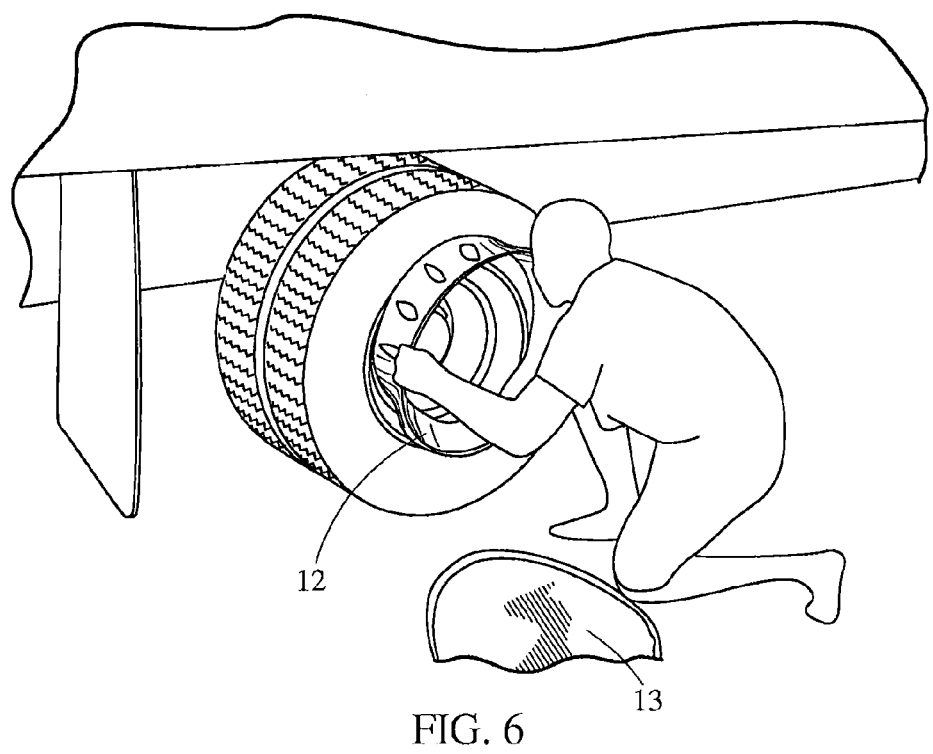
FIG. 6 shows the attachment portion being positioned within the cavity of the motor vehicle wheel.
Figure 2:
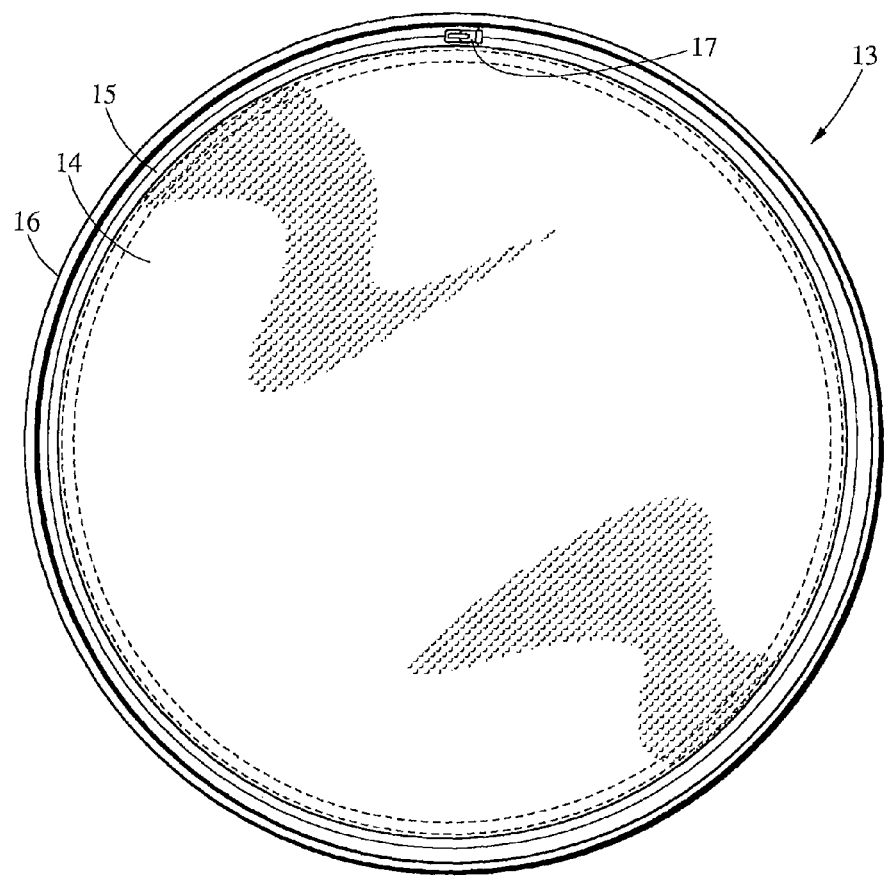
FIGS. 2 and 3 respectively are the front plan and side views of an example wheel covering device.
Figure 3:
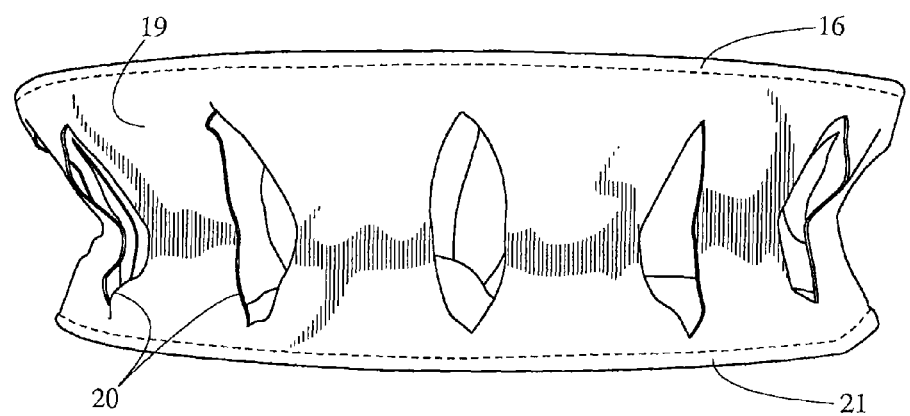
Figure 4:
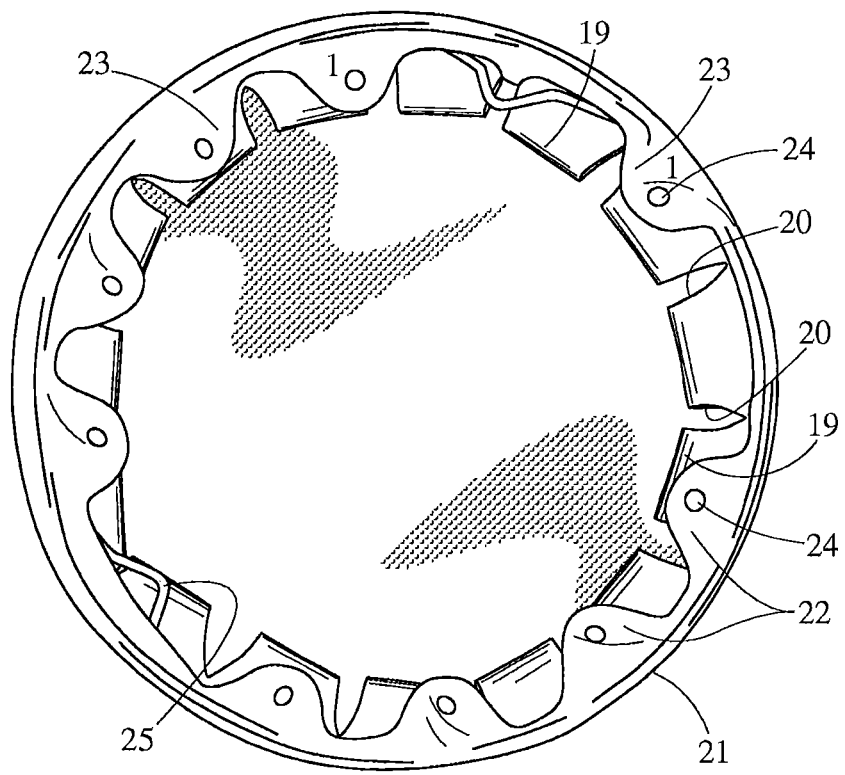
FIG. 4 is a rear plan view of the wheel covering device.
Figure 5:
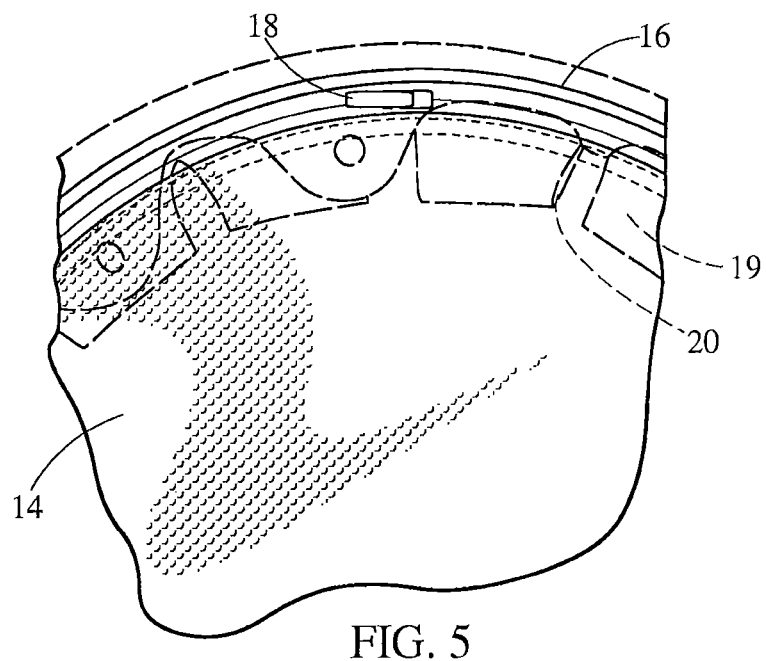
FIG. 5 shows a detail of FIG. 4 with the attachment portion shown in dashed lines.

FIG. 2 etc., shows this zipper track sewn into the outer edge of the flexible lamina 14 that encases the outer ring 16. The zipper track extends slightly more than 360 degrees around this outer ring so that the start and end of the zipper track overlaps slightly (see FIGS. 2 and 5).

Figure 7:
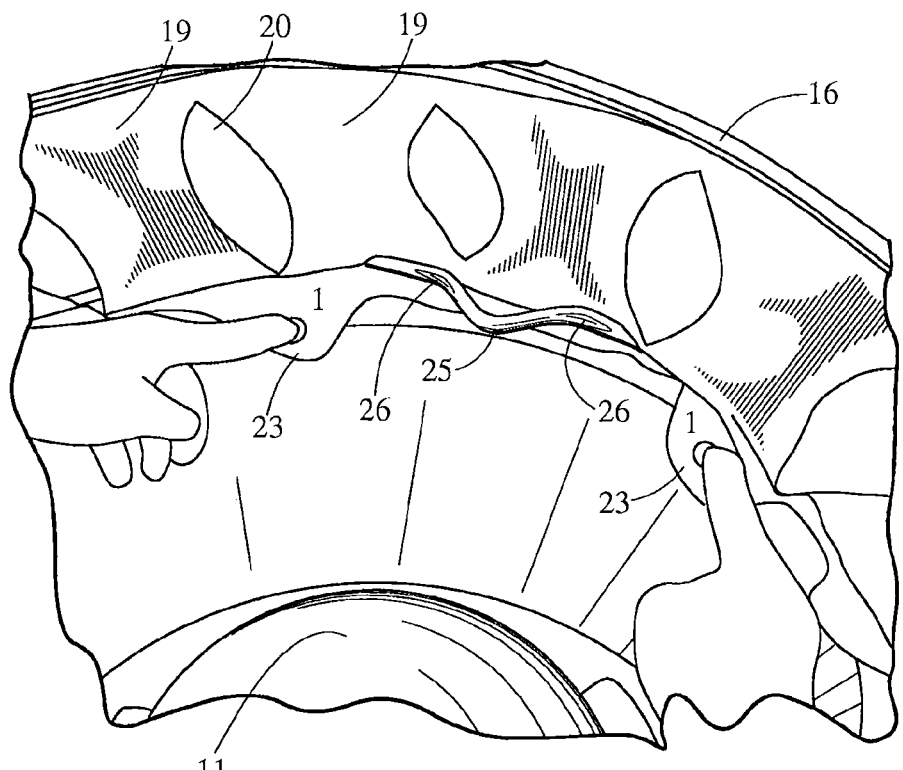
FIG. 7 shows a detailed view of a positioning step according to the method.
Figure 8:
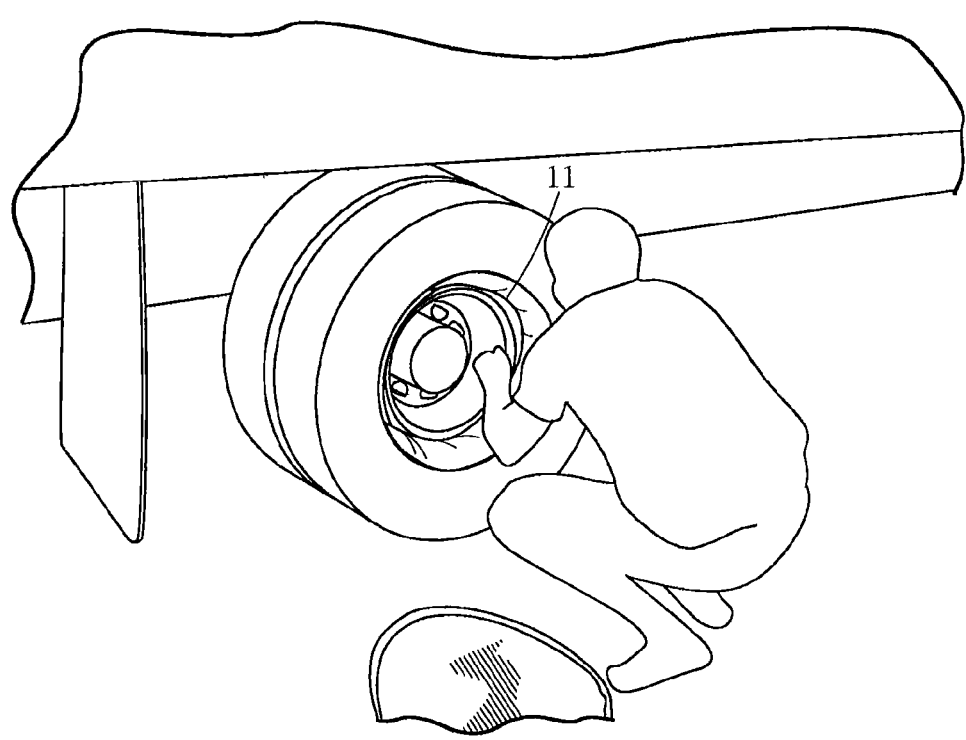
FIG. 8 shows the attachment portion properly positioned within the cavity of the wheel.
Figure 9:
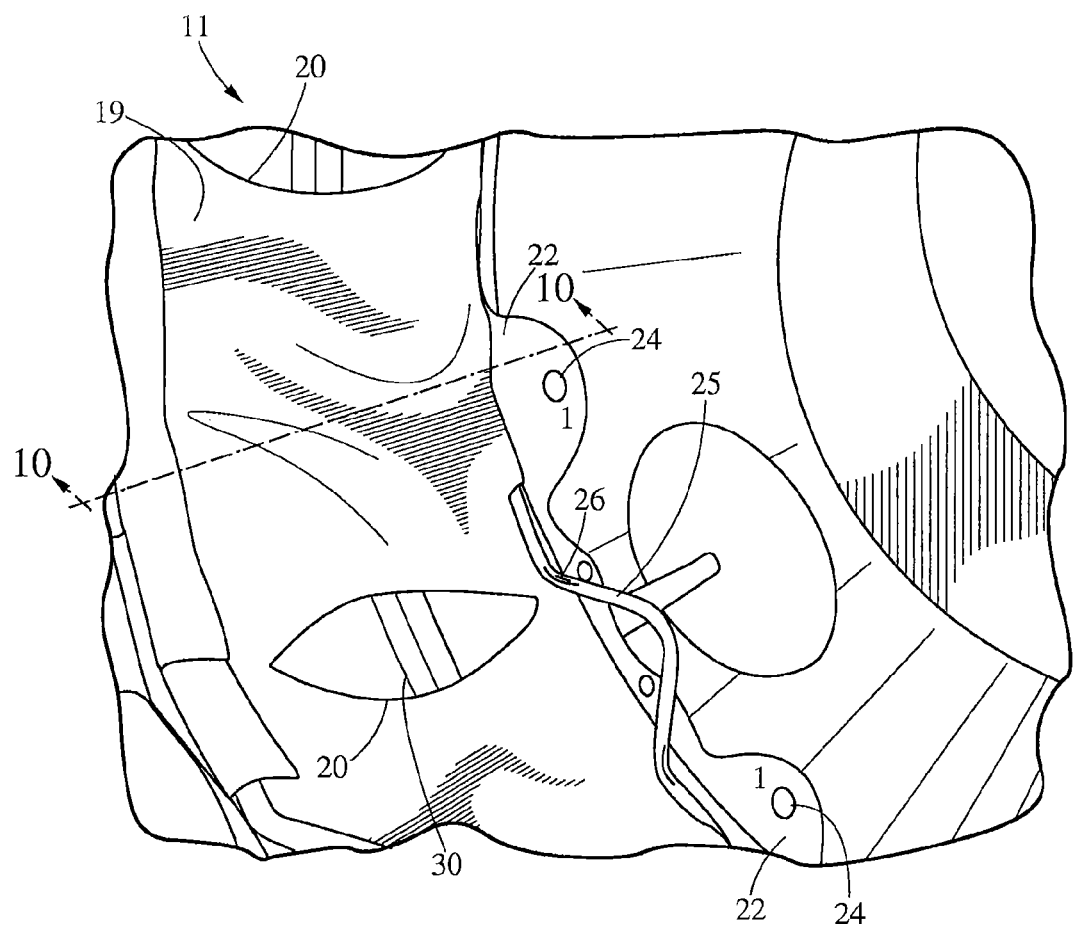
FIG. 9 is a close-up of the attachment portion in position within the wheel cavity.

FIGS. 1 and 6 through 10 illustrate steps in the process of closing the open cavity in the wheel used to carry a long-haul truck or tractor trailer, including the steps of mounting the attachment system 12 within the cavity of the wheel 11 and fixing the wheel cover 13 to the attachment system. First, the attachment system and cover are unzipped from one another. Like any zipper connection, the subject attachment continues from fitting the tab of the zipper into the corresponding portion of the zipper slider 17, and the slider is moved along the corresponding zipper track by pulling tab 18 until the wheel disk is attached as shown in FIG. 7.

Figure 11:
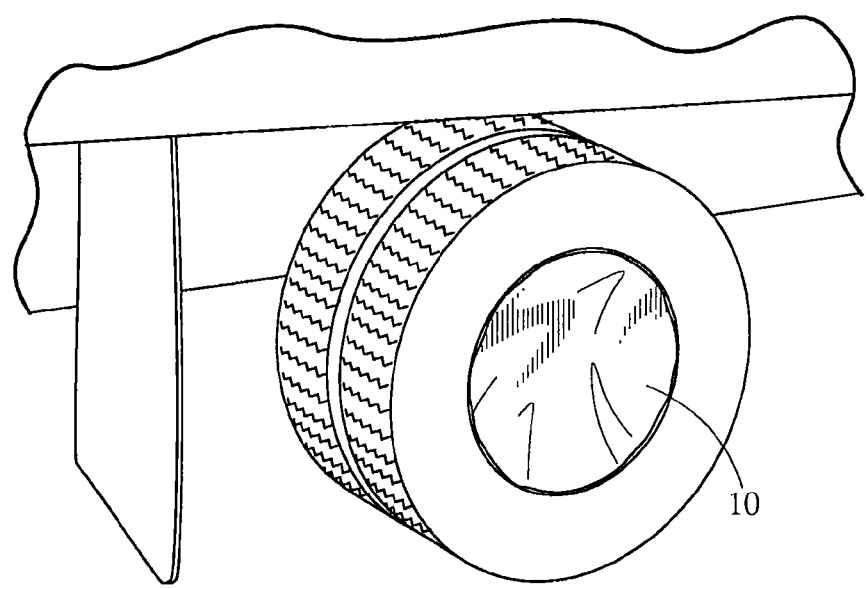
FIG. 11 shows the disk shaped lamina in an attached position on the wheel covering the cavity of the wheel.
Figure 12:
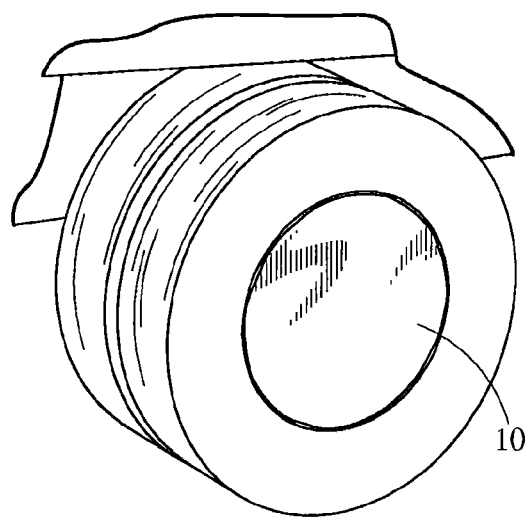
FIG. 12 shows the assembled streamlining flexible disk with the motor vehicle and its wheel moving at high velocity on a test run.

FIG. 11 shows the completed streamlined long-haul tractor trailer or truck or motor coach wheel. The cover portion itself should be similarly durable textile material to that 19 shown connecting the rings 16 and 21. In this particular case the material of choice is a polyvinyl chloride coated textile of the type described above. As a result of this overall textile construction, the overall weight of the finished streamlining wheel cover is remarkably low. Since the textile is inherently weather resistant and quite durable, it can withstand the rigors of road travel quite well, but still perform the function of reducing the overall wind resistance of the wheel cavity when the wheel is moving at velocity down the highway, decorating one or more wheels, providing advertising space, and/or the like. FIG. 13 shows the streamlining cover as it functions to reduce the wind resistance and drag relative to an uncovered drop center wheel. The cover likely forms a barrier—isolating the low pressure of the wheel cavity from the high pressure environment of the air rushing by. Ideally, the cover would be as aerodynamic as possible although simply isolating the two atmospheres of differing pressures should have beneficial effect to the overall drag reduction function desired. If a flatter or convex wheel cover is desired, a rigid or inflatable support may be positioned at or around the central axis of the truck wheel cavity to hold the generally flexible wheel disk in a more aesthetically desired or aerodynamically desired shape. It should be understood that a disk of foamed polymer could be substituted for the textile material, as long as the substitute material had the light weight and flexible characteristics taught herein. Also, while a zipper attachment between the mounting assembly and the streamlining disk is described herein as a way of assembling, it will be appreciated that other secure systems could be used, such as a paired hook and loop fastener strips, lacing systems using eyelets or speed lacing lugs, or other strong, generally continuous attachment scheme.

FIG. 13 provides a more detailed view of slightly alternative attachment portioned construction. First, two generally rigid wire rings are shown, the first shown on the left include two kinked portions, one of which comprises a tubular metal connection to hold the two ends of the single length of spring steel wire which is used to form the resilient ring. This ring also includes a kinked portion 180 degrees opposite from the attachment to the combination of these two kink portions provides a good degree of flexing but still does not compromise the overall resilient but firm connection between the ring and the inner facing surface of the wheel. The other ring to the right does not include the extra kinked portion but does have the tubular portion including the kink at one location on its diameter. These two rings or similar rings are shown attached to the flexible textile strips that hold the two rings to either side of the drop center. This is illustrated by the typical motor vehicle wheel shown just above those exemplary rings. FIG. 13 shows in detail how these rings are positioned along and around the central wheel cavity. Note that the textile strips do not need to extend entirely around the inner circumference of wheel. Rather, the two strips are interrupted only at the kinked portions of the rings, but help position the rings precisely to either side of the drop center. It could be that any interruptions, slits, hook and loop straps, etc., spanning the two rings should be angled to take advantage of the possibility that the outer ring, with the greater rotational inertia of its attached laminar disk, will be more likely to slip relative to the wheel surface during hard braking by the motor vehicle. If the slits, interruptions, or straps are angled relative to the axis of rotation such that they tend to cinch the two rings towards one another, the frictional engagement would increase as engaging force of the material spanning the drop center increases.

FIG. 13 also shows the kinked portions aligned to each other at the same radial position, that radial position is defined by the air valve stem.

An example method of using the disclosed device will now be detailed. Referring to the Figures, in one implementation, the first step is to clean and lubricate the inner surface of the wheel cavity, especially the drop center with a spray of water. This reduces the grit that could abrade the flexible connection and other parts of the disclosed device, but also reduces friction so that the inner ring 16 can be pulled through the smaller diameter of the drop center more easily using the pull tabs 22. The installer reaches through the opening of the outer ring and zipper track 15, and grabs the two pull tabs 22 marked with the number "1" lining them up to straddle the filler valve. The holes 24 provide convenient grips to help the installer pull the ring into its initial position at the filler valve. Then, working with the next tabs out from these two marked with "1", the ring 21 is pulled through the drop center diameter until it comes to rest in the annular valley between the drop center and the wheel face. Any slight radial adjustment of the ring 16, the connection 19, and the second ring should be done now while the wheel surfaces are still wet and slightly slippery.

Once the attachment system is in place and adjusted, the cover 13 is zipped onto the zipper track 15, thus closing the access to the attachment system and closing of course the wheel cavity. Any slight misalignment of the outer ring relative to the tapered portion of the wheel will usually go away during the initial few kilometers of over the road travel due to the self centering operation of the attachment system as discussed above Once the basic idea of a flexible attachment and generally flexible wheel disk is understood, variations become clearly obvious. For example other attachment schemes besides a circumferential zipper might be contemplated for particular applications. For example one could merely provide an access port or slit through the wheel disk. This would permit the installer to manipulate the inner and outer rings and to adjust the hook and loop fastener straps between the two rings without having to completely dismount the disk from the attachment assembly. This slit could extend only partially across the center of the wheel disk or entirely across the center of the wheel disk in a single straight line, so long as it is large enough to permit the hand or hands of the installer to access the inner and outer rings, to locate the ring's kinked portions relative to the valve stem, and to inspect the wheel and the proper positioning of all of the parts of the streamlining disk assembly during installation and during use.

The disk portion of the streamlining assembly lends itself to advertising copy, graphics and the like. The textile material used to make the disk could be treated to receive conventional automotive paints and other finishes so that the disk portion could be coordinated with the aesthetics of the motor vehicle. Alternatively company logos could be applied to the disk using conventional silk screening or printing techniques.

Also, it should be clear from this disclosure that other ways to hold the generally stiff, resilient, springy rings on each side of the drop center portion are contemplated herein. For example, the rings could be completely or partially enclosed in injection molded shapes. These shapes could include attachment loops to receive flexible straps, laces, or cords to cinch the rings across the drop center portion. Such molded shapes could also include high friction materials and surfaces to help prevent relative circumferential slipping during braking or other environmental forces as mentioned above. Variations on the disclosed closing or streamlining device 10 and its method of mounting and use become immediately apparent. For example, the device may use a strong zipper to form a releasable connection between that attachment system 12 and the cover portion 13. Thus, the cover portion can be completely removed during installation, and the portions 12 and 13 could each be replaced or refurbished as needed while the remaining portions reused. But the essential function of the zipper 15, that is to provide manual access to interior cavity of the wheel 11 for pulling the attachment system into position or for its removal, for adjusting tire pressure, or for visual inspection of the device 10 while in place in the wheel or for visually inspecting the wheel or the truck hub to which it is attached could be accommodated by a shorter zipper (or some other releasable fastener system known in the art) that only goes partially around the circumference of the cover, or goes across only a center portion of the cover 13. For example, a slit through the cover 13 sized to permit a person's hand or hands to pass through to the wheel cavity could cut across the center of the wheel. This slit could be closed by a short zipper, hook and loop fasteners of known type, lacing, etc. Such a modification may not have the advantages provided by the example system detailed above, such as full access to the entire attachment system, permitting the rings to flex during installation without being constrained by the cover, and providing interchangeable or multiple covers for a single attachment system.

The beneficial effects of providing a shaped cover to close off motor vehicle wheel cavities have been shown. It is easy to see additional benefits when one considers that over the life of a typical tractor-trailer truck, fuel cost alone can be a staggering burden, equaling if not exceeding the initial capital cost of the truck. For example, if such a truck traversed 110,000 miles a year over seven years fuel cost (currently at around $3.00 per gallon for diesel fuel) could amount to 70% of the cost of ownership. Thus any appreciable reduction in fuel expenditures could easily pay for the cost of these remarkably efficient and cost effective wheel covers. Initial tests under controlled conditions indicate that fuel savings for between about 0.975% and 2% could be expected as a result of using the disclosed wheel cover system and method, depending on the number of wheels covered, location of the wheels covered, and driving conditions.

Figure 15:
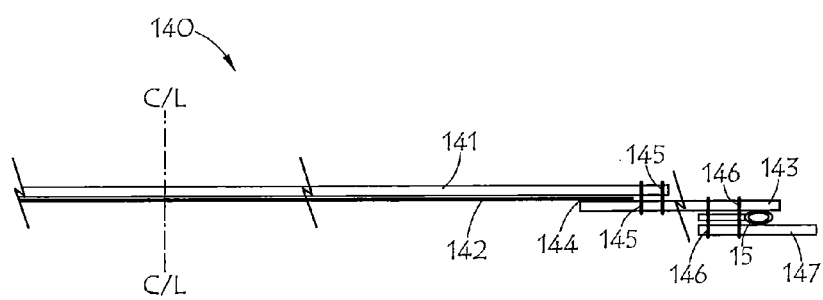
FIG. 15 is a partial cross section view of the wheel cover assembly of FIG. 14 showing the major structural portions thereof, including the inwardly facing face and outer face of the transparent window in profile.
Figure 16:
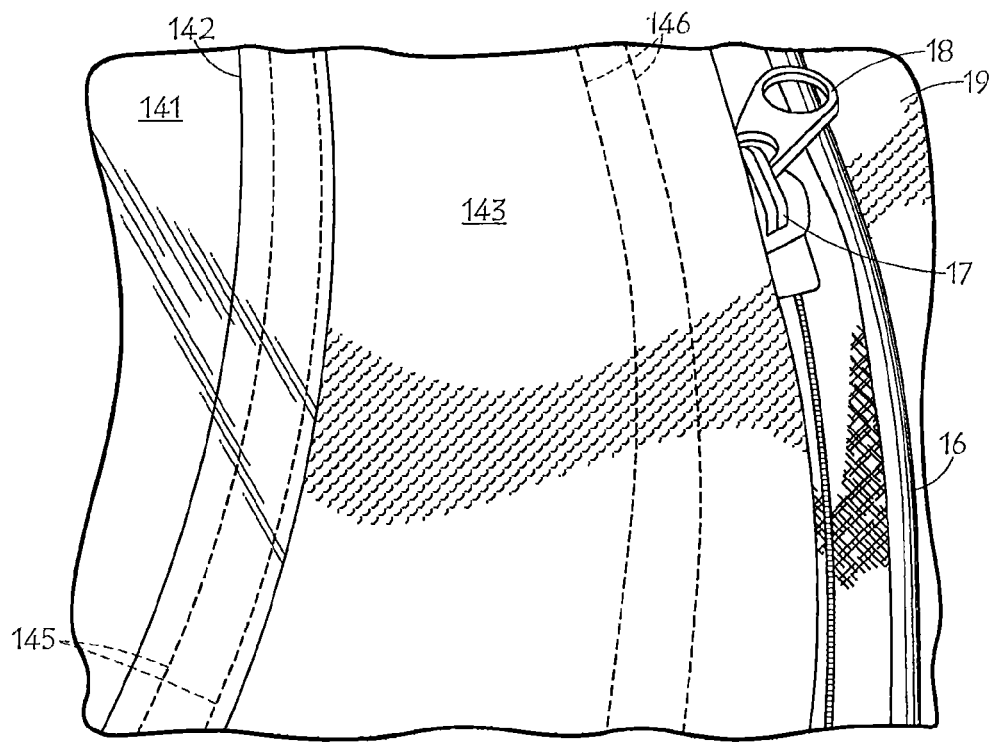
FIG. 16 is a detailed perspective view of a typical outer circumference portion of the wheel cover shown in FIG. 14.
Figure 17:
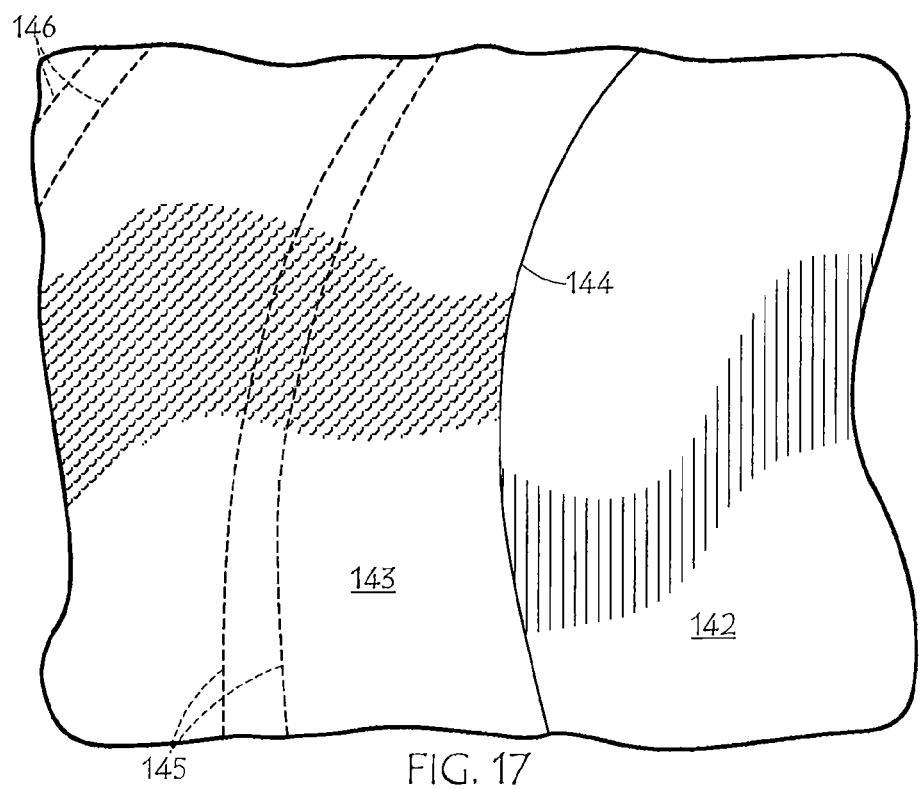
FIG. 17 is a perspective view of a portion of the outer circumference of the wheel cover as seen from the inside, which is the side normally facing the vehicle wheel covered thereby.
Figure 18:
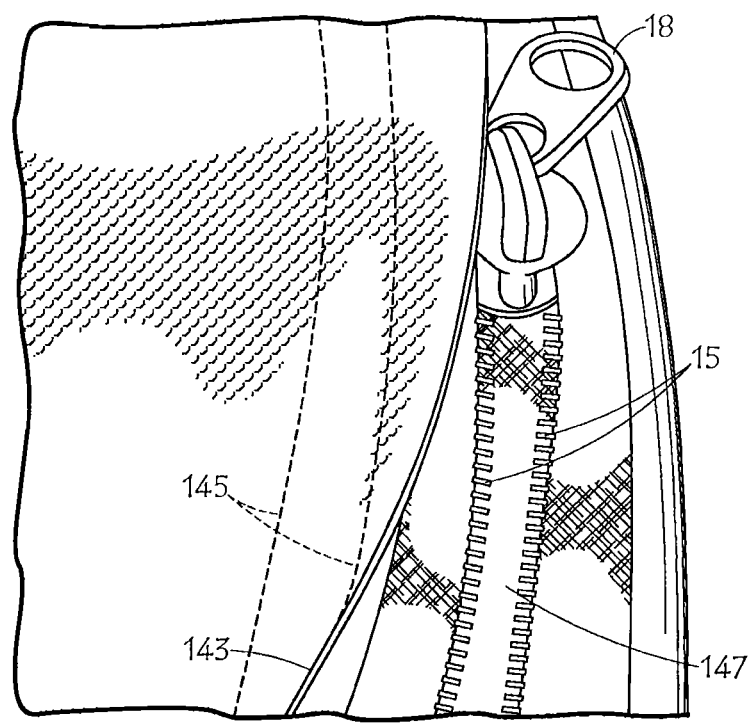
FIG. 18 is a detailed view of the integrally formed flap that normally covers the outwardly facing surface of the manually operable connection in the form of a circumferential connection or zipper.
Figure 19:
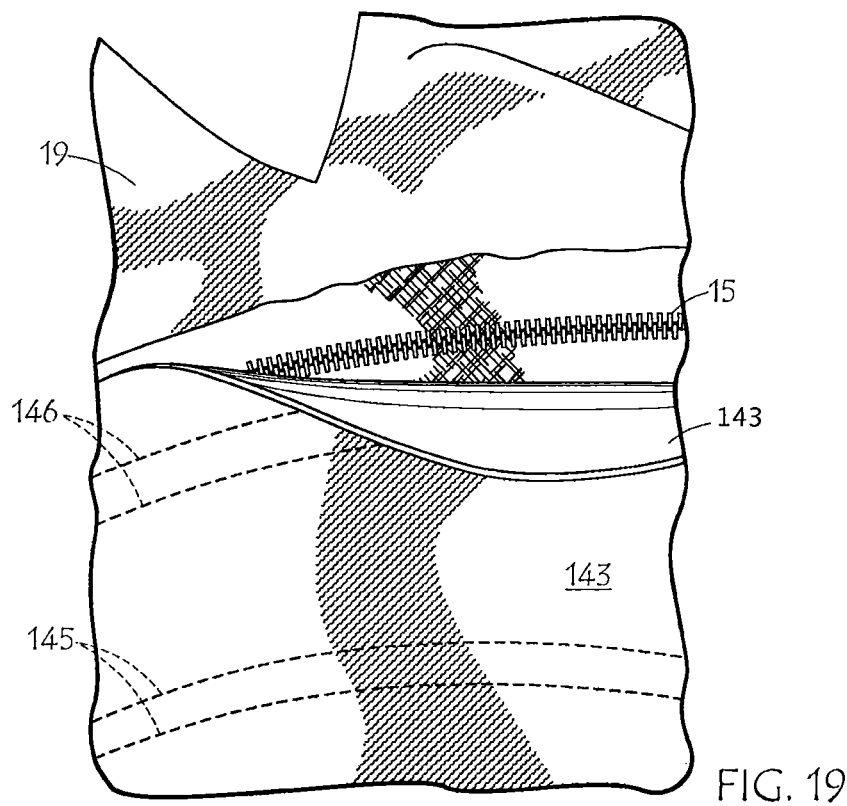
FIG. 19 is a detailed view of a portion of the inwardly facing side (or the side facing the vehicle wheel to be covered) showing inner integrally formed flap that normally covers the inside surface of the circumferential connection or zipper.
Figure 20:
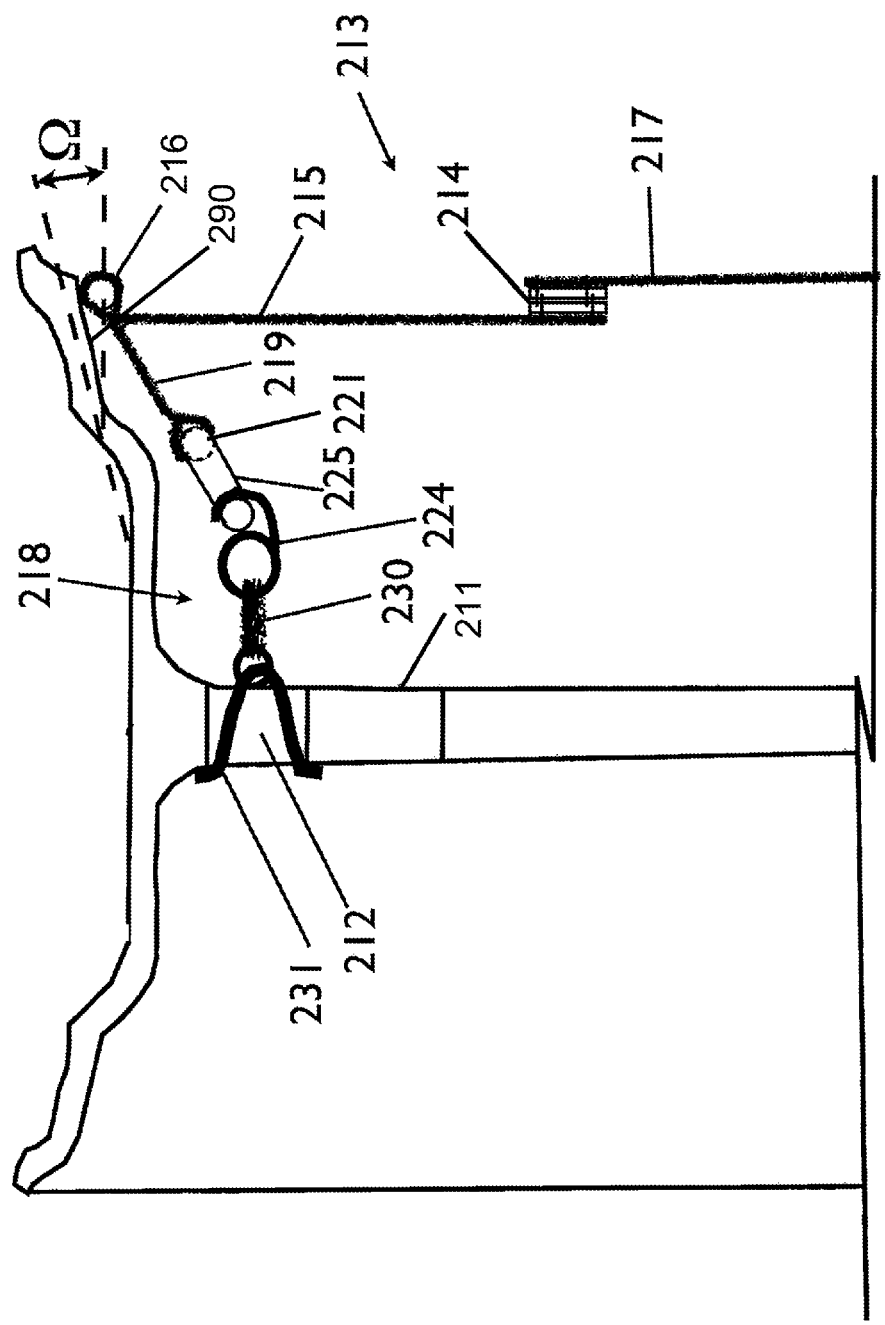
FIG. 20 is a partial cross-sectional view of a wide based or "super single" wheel with a wheel streamlining device installed.

The implementation illustrated in FIGS. 14 through 17 permits graphic information carried by the wheel cover assembly to be changed by merely inserting or changing a display card carried by and protected by the wheel cover assembly. The cover portion 140 includes a circular "window" portion formed of a transparent portion 141 made of a flexible transparent laminar vinyl material about 1 mm thick. This circular window is stitched to an annular portion 143 of reinforced textile material as generally disclosed in the parent PCT application. This annular portion overlaps the inside circumference of the window portion 141 by about 3 cm to form a circumferentially extending flap 144 that holds a circular display card 142 against the inward facing face of the window portion 141 as seen in FIG. 15. The display card 142 can include indicia such as advertising, instructions, and/or a decorative graphic and is made of a conventional paper card stock about 0.5 mm thick. The display card 142 can be inserted between the flap 144 formed by the annular space between the innermost edge part of the annular portion 143 and the circumference defined by the stitch lines 145 and 145 that affix the transparent flexible polymer portion 141 to the annular portion 143. The outermost edge of annular portion 143 overlaps the zipper track 15, which normally holds the cover 140 to the attachment portion. Circumferential stitch lines 146 and 146 pass through the zipper tape portion of the zipper and hold it in place.

At the outermost circumference of the cover 140, a further annular member of reinforced textile 147 is also stitched to the zipper track by stitch lines 146 and 146 and extends further radially outwardly. This member 147 forms another gland seal to reduce the tendency of the teeth of the zipper to accumulate dirt during road travel.

The display card 142 may be circular as stated above and can be inserted between the centrally mounted, circular window 141 and the flap formed between inner edge 144 and the stitching 145. Alternatively, this display card 142 can be eliminated so that the wheels streamlined by the disclosed construction can be inspected without operating zipper 15.

Note that the sealing flaps formed by members 143 and 147 face radially outwardly. This takes advantage of the centripetal force on these flexible portions when the vehicle is rolling at typical highway speeds on the thus covered and decorated wheels having the disclosed wheel cover assembly mounted thereon. The centripetal force thus tends to throw the dirt and water clinging to the cover radially outwardly as well as help to hold these overlapping flap members against the teeth of zipper 15, further enhancing the dirt-excluding function of these portions of the disclosed structure. Similarly, the outermost edge of the transparent window portion 141 faces radially outwardly, thus urging rain, dirt in the like to be shed outwardly away from the seam formed by the stitching 145 and 145. This helps to keep such rain and dirt out from within the covered portion of the wheel, as well as keep the display card 142 relatively free from such dirt and precipitation.

The advantages of the disclosed improved wheel cover assembly are many. First the inner and outer flaps formed by the annular members 143 and 147 reduce the accumulation of dirt and dust on the zipper, reducing the resulting friction and clogging of the zipper slider 17, and facilitating manual operation of the zipper by the pull tab 18, especially after road use. The built-in window 141 as detailed above permits the inspection of the wheel without operating the zipper. In the alternative or additionally, the window permits the operator of the over the road vehicle using the subject cover assembly to display advertising or custom decorative graphics. The vehicle operator can change the display card easily to, for example, promote his or her favorite sports team or the company who contracted for the over the road shipping being carried by the vehicle, etc.

While the flap 144 is shown to comprise of a continuous annular extension of the annular portion 143 overlapping onto the inward facing side or face of the window portion, it is understood that other structures are contemplated which would serve to hold a display card 142 or other media to be displayed on the wheel cover assembly. For example, the flap could be divided into discontinuous portions, such as two, three or four portions spaced around the circumference of the wheel cover. Or, two or more individual tabs of semi-rigid material, such as polyethylene sheet, could be fastened to the wheel cover to grip the back of the card 142 to be displayed. Strips of such material, or lengths of elastic material could be fastened at each end of their lengths so that the strips extend radially across the window 141 so that a display card or such media would be sandwiched between the window 141 and these attachment aids. Also, while the attachment assembly for holding the wheel cover assembly to the drop center of an over the road vehicle wheel works very well, other attachment systems could work and still take advantage of the disclosed selectively transparent wheel cover portion. For example, in lieu of the zipper track, etc, attached to resilient annular steel rings, etc., detailed above, the attachment assembly could have a series of clips, buckles, or studs directly affixed to or at the outer circumference of the vehicle wheel to which the wheel cover portion can be selectively attached with mating clips, straps or eyelets. Also, while the display card is shown to be circular and continuous, and when in place thus obscuring viewing the covered wheel from view, it is understood that the display card could include apertures or could be shaped to create gaps between the card and portions of the outer periphery of the transparent window. In this situation, both the advertising and decorative aspects of the display card can be had simultaneously with the ability to visually inspect the covered wheel through the unobscured portions of the transparent polymer window portion.

Referring to FIGS. 20 to 26, a further implementation will be described in detail. In general, and unless specifically otherwise stated, the materials and general geometries of the previously described implementations may be used with or be substantially similar to the implementation shown in FIGS. 20 through 26. However, as stated previously, the implementation of FIG. 20, etc., is especially desirable for use in truck or bus wheels sometimes called wide based or "super single" wheels, where the drop center portion of the wheel is positioned around and directly over the face of the wheel such that the drop center portion is not available for being engaged by the inner ring 25 of the previous implementations.

Generally, this implementation consists of at least two assemblies, a textile cover assembly 213 and one or more attachment assemblies 218. The cover assembly 213 may be attached and removed from the front tapering inner surface of the wheel 290 without the use of tools. That is, the technician, mechanic or truck operator can attach and remove the assembly 213 entirely manually as will be detailed. In contrast, the attachment assemblies 218, while also attachable to the wheel without the use of tools, can remain and generally remains attached to the wheel when the cover assembly 213 has been removed for a maintenance, inspection, or to control venting.

The cover assembly 213 comprises a generally taut or stretched right circular membrane 215 which extends across substantially the entire front or exposed, outward facing portion of the truck wheel 211. The outer circumference of the membrane 215 is attached using conventional sewing techniques to a hoop or ring 216 that is sized to rest on and be held against the tapered portion (characterized by taper angle Ω) of the wheel 290. Of course the truck tire (not shown) is mounted on the outer perimeter of the wheel when operating. In one implementation, the membrane 215 has a closeable opening in its center portion, the closure 217 being attached by manually operable fastener, such as a paired hook and loop fastener system which extends around the periphery of the removable cover 217.

Also attached to the hoop 216 is a flexible connector portion 219. The flexible connector can comprise one or more strips of industrial textile or it could be simply an extension of the membrane 215, all of these being sewn firmly around the periphery of the ring 216. In one implementation, connector 219 includes oval shape openings 220 that help the textile strips form to a generally cylindrical or frustoconical shape that extends from the outermost portion of the wheel towards the main face of the wheel. The flexible connector 219 carries a second hoop 221. This hoop is sewn to the innermost edge of flexible connector 219. Kinked portions 225 extend further in relief and are integrally formed in this ring 221 and form convenient locations for removably attaching hook 224.

In more detail, the inner or second ring 221 has several kinked portions 225. The number of these kinked portions 225 depends on, in part, the number of openings 212 through the face of the wheel 211. Generally, wide based "super single" wheels are made of cast and machined aluminum. The face generally includes ten openings 212, which are generally cylindrical but may be other shape for decorative purposes. Further, the face of the wide based aluminum wheels also include typically eight bolt holes 223 for attaching the wheel to the truck hub, as well as a large center opening to receive other portions of the axle assembly. Thus, in a one implementation, the inner ring 221 includes five kinked portions 225, which as will be detailed, are normally positioned adjacent every other of the face openings 212 when the textile cover assembly is mounted on the truck wheel.

In one implementation, the attachment assembly generally comprises three main portions which remain assembled, and as will be detailed, can remain attached to the truck wheel prior to positioning and attaching the textile cover assembly to streamline wheel or after the cover assembly has been manually removed. Hook 224 comprises a protruding hook sized to easily engage one kinked portion 225 of the hoop 221. The hook also includes an opening or ring which is sized for one or more gloved fingers. Also this finger receiving loop is integral with or engages the springy portion 230 that is intended to apply a tension force between the wheel face and the inner hoop 221. The innermost end of the springy portion 230 is attached to and engages a central bite of a bale 231. The bale 231 is made of a corrosion-resistant springy material, such as spring steel wire or rod. The size and dimensions of the bale are such that an operator can manually flex the end portions of the bale inwardly to pass through the hole 212. These ends spring outwardly when released to engage the inner surface of the face along the sides of the hole 212. The center bite portion thus, in turn, engages an inner end 252 of the springy portion 230. In this way, one or more (e.g., five) of the attachment assemblies can be pre-positioned and affixed to every other of the ten or so holes 212 in the face of the truck wheel in preparation for mounting the textile cover assembly 213. As will be detailed, the springy portion may consist of the length of a bungee cord, a coil spring or as exemplified in FIG. 26, a series of coil-type springs.

Figure 21:
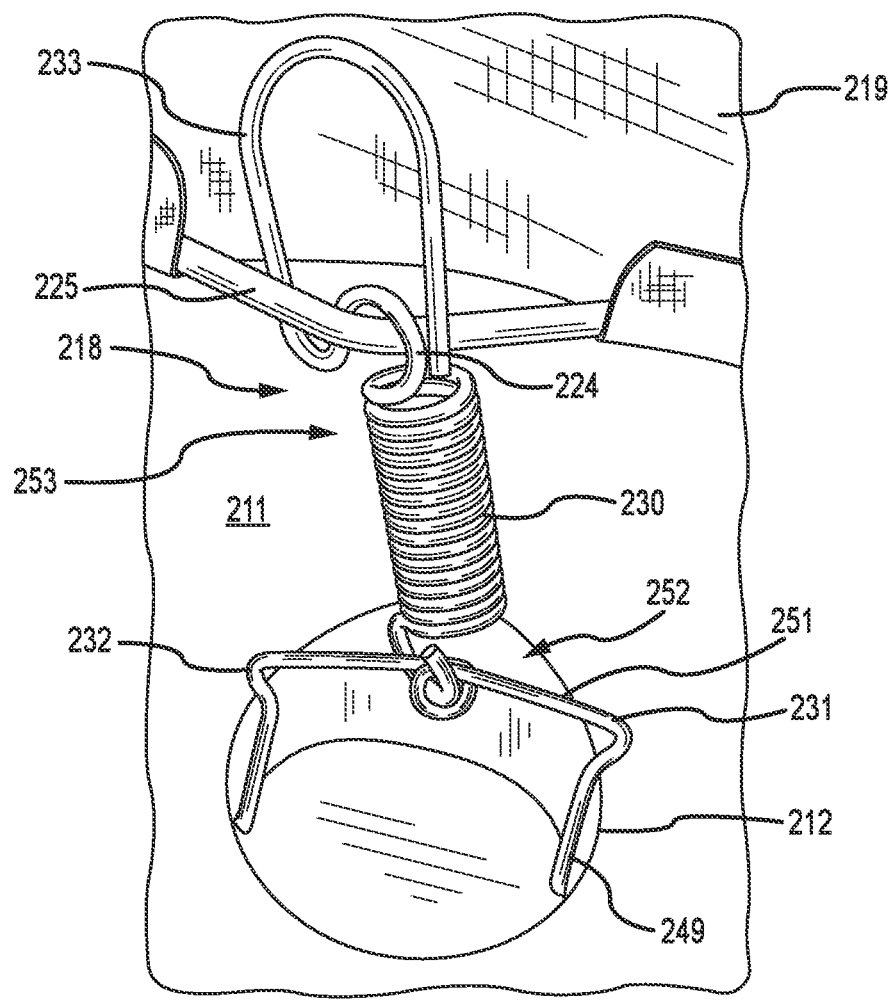
FIG. 21 is a detailed view of an attachment assembly in position on the wheel.
Figure 22:
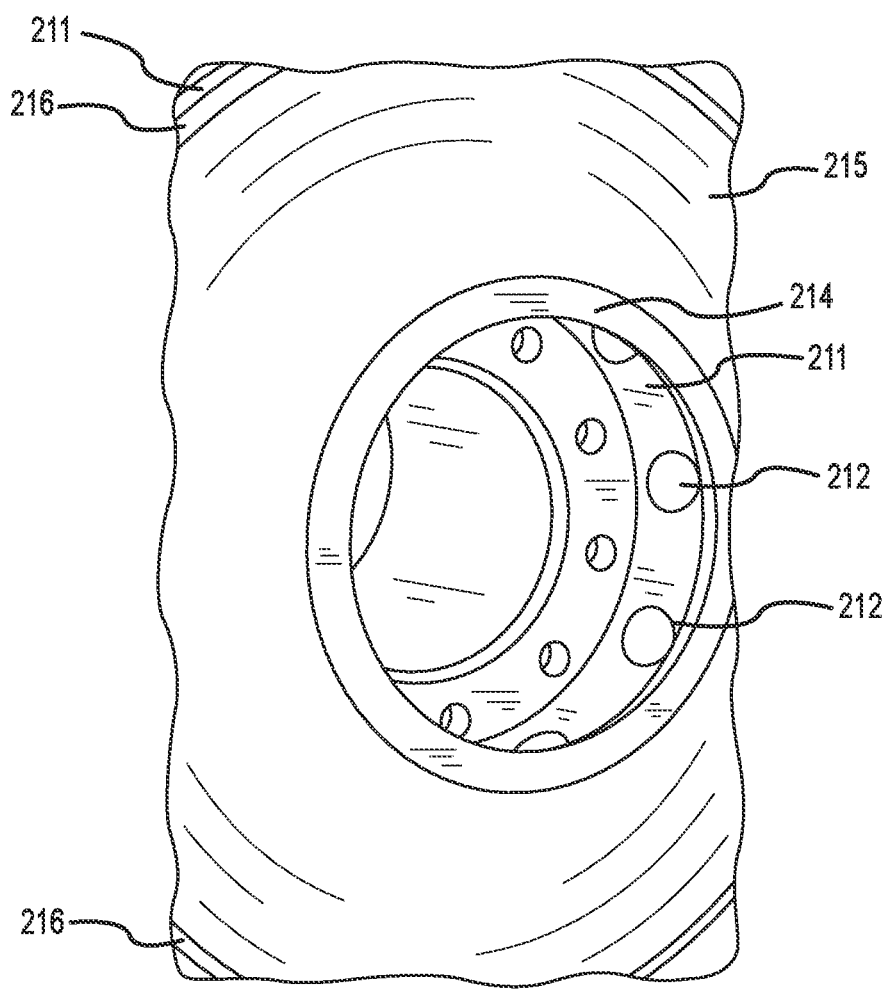
FIG. 22 shows a further implementation of the cover shown in FIG. 20 as viewed from the outside of the covered wheel.
Figure 23:
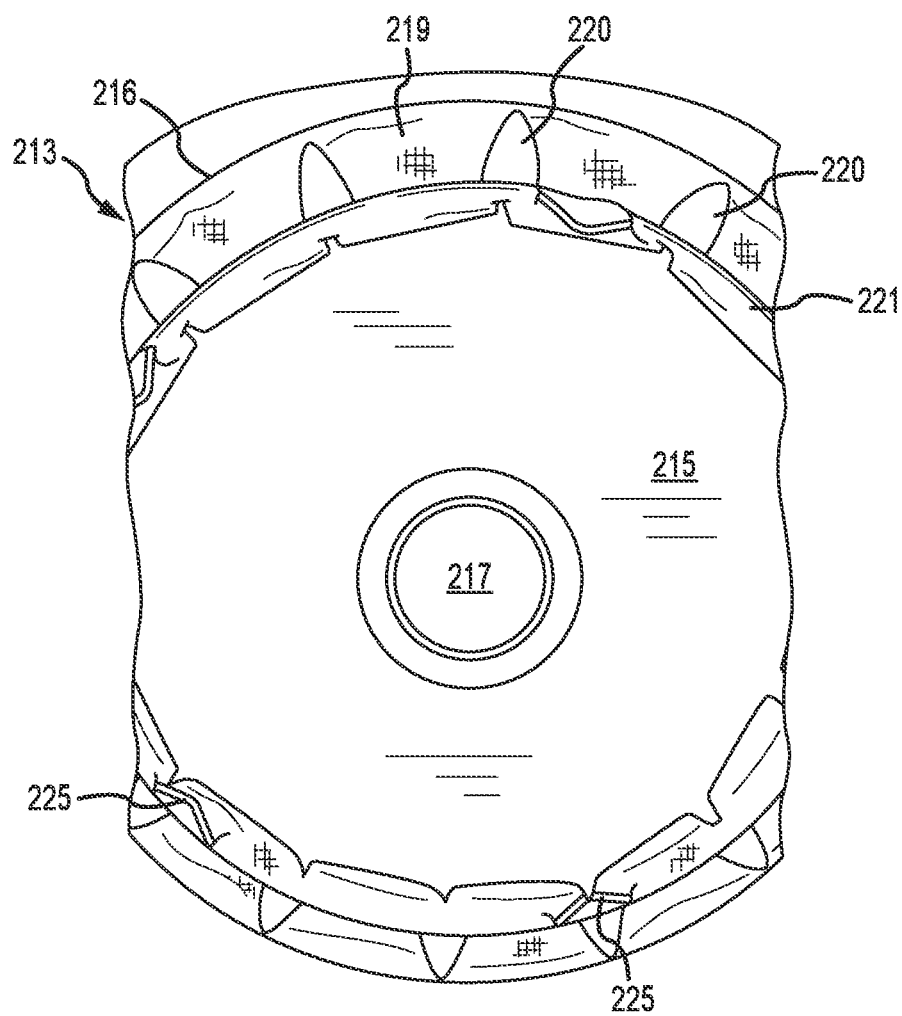
FIG. 23 is a partial view of the inside of the textile cover assembly.
Figure 24:
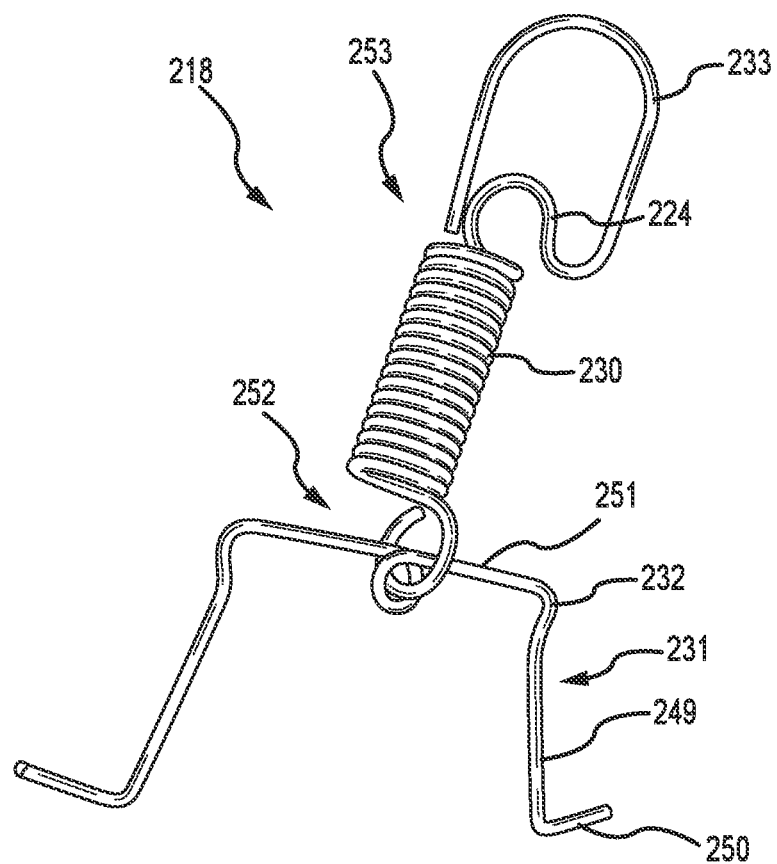
FIG. 24 is a detailed view of an implementation of the attachment assembly.
Figure 25:
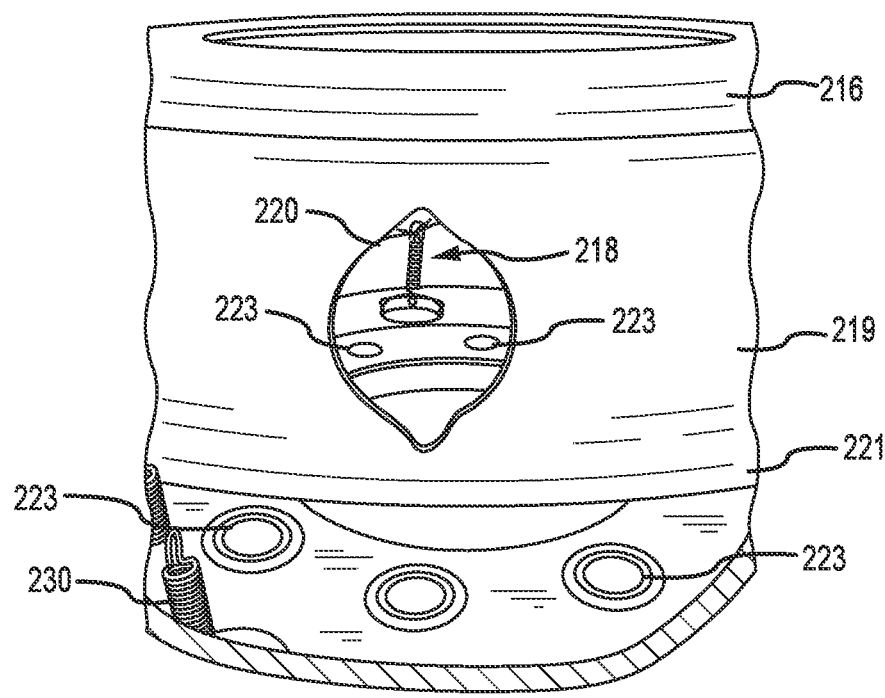
FIG. 25 is a side view of the textile cover assembly positioned over a cutaway wheel.

FIG. 21 shows an example configuration of one of the attachment assemblies 218. Note that the attachment assembly shown in the FIG. 24 also includes the bale 231. Bale 231 as distal ends 249 characterized by outwardly extending terminal portions 250 spaced from one another and sized to engage substantial portion of the inward facing surface of the wheel face 211. The center bite 251 of the bale includes a coiled loop of the wire material through which is threaded one end of a coil spring 230. A pair of shoulder portions 232 flanks the bite portion of the bale. These shoulder portions define a diameter dimension which is greater than the diameter of the hole 212 (see FIG. 21). In this way, once seated in a hole 212, the bale is normally only removable by manually squeezing the distal ends of the bale together then pulling the assembly from the hole.

In one implementation, the springy portion consists of several turns of a coil spring which terminate at its outer end 253 in the hook 224. Note that the hook includes a large terminal portion which forms a substantial grip or loop 233 sized to receive one or more gloved fingers of the installer.

Installing this implementation may be done as follows. For a wide based super single or other deep truck wheel of the typical design, five of the attachment assemblies would be positioned, one each in every other of the typical ten holes 212 through the face of the wheel. The installer inserts one of the two distal ends through the selected hole 212 and squeezes the other distal end towards the installed distal end to slip that end through the wheel and allow the bale to spring outwardly. Now each bale and its associated parts of the attachment assembly is firmly but potentially removably affixed to and through a hole 212. This process is repeated four more times to a position, all five of the attachment assemblies to the wheel to be streamlined.

Next the textile cover assembly is manually positioned against the outermost edge of the wheel. The removable cover has been removed so as to give manual and visual access to the hook portions 224 now arrayed around the perimeter of the wheel face. The finger loop 233 of one of the assemblies is pulled outwardly towards the textile cover assembly 213 and the hook 224 is placed over a kinked portion 225 and released. This holds at least one portion of the outer hoop against the wheel. A second finger loop 233 of another of the attachment assemblies, such as one diametrically opposite from the first manipulated attachment assembly, is engaged and pulled over a corresponding kinked portion 225, and so on, and until all of the five attachment assemblies are stretched towards and engaged around their corresponding kinked portions 225. When installed, flexible connectors 219 permit the cover assembly 213 to center itself on the tapered portion of the wide based wheel. Now, the removable cover 217, after minor adjustment and inspection of the various attachment assemblies, may be positioned to seal the textile cover assembly, using the mating hook and loop fastener 214.

Figure 26:
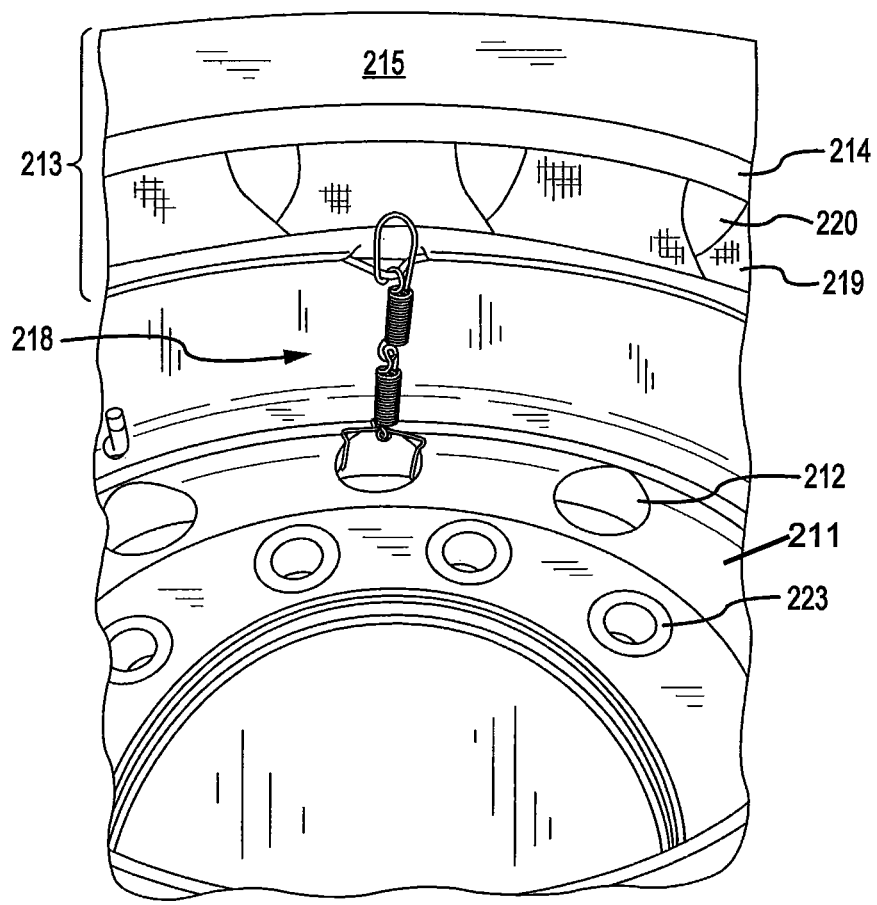
FIG. 26 is a partial view of a textile cover assembly with a further implementation of an attachment assembly.

Variations of the disclosed implementations are of course contemplated by this disclosure. For example, more than one springy portion 230 could be connected in series to accommodate different cavity depths that may be presented by different super single or deep truck wheels. As shown in FIG. 26, two springs are connected to one another to permit covering a deeper wheel. In this case, a wheel cavity with an extra two inches of depth between the outermost edge of the wheel and the face of the wheel.

While a small circular removable cover 217 is shown, other configurations are contemplated. For example, the access could be provided by a single linear slit, which could be selectively opened and closed by a similarly elongated linear hook and loop fastener system or conventional tooth zipper. In one implementation, the removable cover 217 is made of a generally fluid impervious, coated industrial textile similar to the textile membrane 215. However, 217 could also be made an air pervious material, such as a robust nylon screen or the like, or if controlled venting of air through the cover assembly is desired, or it could be removed entirely maximizing routine wheel inspection.

What is claimed is:

1. A wheel streamlining device comprising:
   a cover assembly having a flexible connection extending around a periphery of a ring configured to contact a tapered portion of a wheel;
   a hook configured to removably engage the cover assembly;
   a bale configured to releaseably engage an inner surface of an opening in a face of the wheel; and
   a springy portion extending between the bale and the hook, the springy portion configured to apply a tension force between the ring and the face of the wheel, the tension force holding the ring against the tapered portion of the wheel.

2. The wheel streamlining device of claim 1, wherein the flexible connection includes one or more strips of flexible laminar material.

3. The wheel streamlining device of claim 2, wherein the flexible laminar material is a polyvinyl chloride coated textile.

4. The wheel streamlining device of claim 2, wherein the one or more strips form a cylindrical shape or a frustoconical shape.

5. The wheel streamlining device of claim 1, wherein the cover assembly further includes a releasable connection disposed along a circumference of the ring.

6. The wheel streamlining device of claim 5, wherein the releasable connection is configured to releasably engage a cover portion to cover the wheel.

7. The wheel streamlining device of claim 5, wherein the releasable connection is an extension of the flexible connection.

8. The wheel streamlining device of claim 1, wherein the cover assembly further includes a cover portion configured to cover the wheel.

9. The wheel streamlining device of claim 8, wherein the cover portion includes a transparent window.

10. The wheel streamlining device of claim 1, wherein the cover assembly further includes a second ring connected to the ring by the flexible connection, the hook configured to removably engage the second ring.

11. The wheel streamlining device of claim 10, wherein the hook is configured to removably engage a kinked portion of the second ring.

12. The wheel streamlining device of claim 1, wherein the springy portion includes a series of coil springs.

13. The wheel streamlining device of claim 1, wherein the springy portion includes a bungee cord.

14. The wheel streamlining device of claim 1, wherein the springy portion includes a coil spring.

15. The wheel streamlining device of claim 1, wherein the bale includes distal ends connected by a center bite, the distal ends having outwardly extending terminal portions configured to engage the inner surface of the opening in the face of the wheel.

16. The wheel streamlining device of claim 15, wherein the springy portion extends between an inner end and an outer end, the inner end of the springy portion attached to the center bite of the bale.

17. The wheel streamlining device of claim 16, wherein the hook is attached to the outer end of the springy portion.

18. The wheel streamlining device of claim 15, wherein the center bite includes a pair of shoulder portions extending outside a diameter of the opening in the face of the wheel.

19. The wheel streamlining device of claim 1, wherein the hook includes a grip.

20. A wheel streamlining device comprising:
a cover assembly having a ring configured to contact a tapered portion of a wheel and a cover portion configured to releasably engage a fastener to cover the wheel, the fastener disposed along a circumference of the ring; and
an attachment assembly configured to apply a tension force between the ring and a face of the wheel, the tension force holding the ring against the tapered portion of the wheel.

* * * * *